United States Patent
Beyene et al.

(10) Patent No.: US 12,432,238 B1
(45) Date of Patent: Sep. 30, 2025

(54) SYSTEM AND METHOD FOR IDENTIFYING ANOMALOUS NETWORK THREAT EVENTS THAT OCCUR IN A PRIVATE COMPUTER NETWORK

(71) Applicant: Trend Micro Incorporated, Tokyo (JP)

(72) Inventors: Yordanos Beyene, Roseville, CA (US); Chin-En Yang, Austin, TX (US); Catherine S. Curtis, Roseville, CA (US)

(73) Assignee: Trend Micro Incorporated, Tokyo (JP)

( * ) Notice: Subject to any disclaimer, the term of this patent is extended or adjusted under 35 U.S.C. 154(b) by 278 days.

(21) Appl. No.: 18/335,639

(22) Filed: Jun. 15, 2023

(51) Int. Cl.
H04L 9/40 (2022.01)

(52) U.S. Cl.
CPC ...... H04L 63/1425 (2013.01); H04L 63/1416 (2013.01); H04L 63/20 (2013.01)

(58) Field of Classification Search
None
See application file for complete search history.

(56) References Cited

U.S. PATENT DOCUMENTS

| | | | | |
|---|---|---|---|---|
| 9,215,244 | B2 * | 12/2015 | Ayyagari | H04L 63/1425 |
| 10,764,312 | B2 * | 9/2020 | Wang | G06F 11/0754 |
| 11,277,423 | B2 * | 3/2022 | Brown | H04L 63/1416 |
| 11,716,628 | B2 * | 8/2023 | Kim | H04W 12/37 726/22 |
| 12,189,586 | B2 * | 1/2025 | Olson | H04N 21/2407 |
| 12,231,442 | B2 * | 2/2025 | Bagaria | G06N 5/04 |
| 12,255,905 | B2 * | 3/2025 | Zaytsev | H04L 63/1425 |
| 2016/0112287 | A1 * | 4/2016 | Farmer | H04L 41/14 709/224 |
| 2023/0308401 | A1 * | 9/2023 | Sesha | H04L 49/557 |

OTHER PUBLICATIONS

"Apache Spark", Wikipedia, https://en.wikipedia.org/wiki/Apache_Spark, downloaded Jun. 8, 2023.
"Common Vulnerabilities and Exposures", Wikipedia, https://en.wikipedia.org/wiki/Common_Vulnerabilities_and_Exposures, downloaded May 16, 2023.
(Continued)

*Primary Examiner* — Younes Naji
(74) *Attorney, Agent, or Firm* — Beyer Law Group LLP

(57) ABSTRACT

Network threat events are declared in response to detecting network traffic data indicative of network threats in network traffic involving hosts of a private computer network. Common hosts of the private computer network are identified in network threat events that have occurred within a sampling period. For each identified common host, a baseline of network behavior of the common host in network threat events that have occurred within a sliding time window is generated. A new threat event that has occurred after the sliding time window is identified as anomalous by comparing a network behavior of a common host in the new network threat event against the baseline of network behavior of the common host. An alert is issued in response to detecting an anomalous network threat event that has a risk rating that exceeds a threshold risk level.

20 Claims, 6 Drawing Sheets

(56) References Cited

OTHER PUBLICATIONS

"CVE-2021-40539", CVE., https://cve.mitre.org/cgi-bia/cvename.cgi?name=CVE-2021-40539, downloaded May 17, 2023.
"Databricks", Wikipedia, https://en.wikipedia.org/wiki/Databricks, downloaded May 4, 2023.
"Deep Discovery Inspector", Trend Micro, https://www.trenddefense.com/datasheet/ds_deep_discovery_inspector.pdf, downloaded May 16, 2023.
"Host (network)", Wikipedia, https://en.wikipedia.org/wiki/Host, downloaded May 18, 2023.
"Host names" IBM Documentation, https://www.ibm.com/docs/en/cics-ts/5.3?topic=concepts-host-names, Oct. 13, 2021.
"Hostname", Wikipedia, https://en.wikipedia.org/wiki/Hostname, downloaded May 16, 2023.
"Trend Micro Deep Discovery Inspector", IBM Documentation, https://www.ibm.com/docs/en/dsm?topic=micro-trend-deep-discovery-inspector, May 8, 2023.
"What is a Hostname?", Computer Hope, https://www.computerhope.com/jargon/h/hostname.htm#:~:text=qualified, Oct. 7, 2019.

* cited by examiner

| Source IP Address | Destination IP Address | Target IP | Target hostname | app | Risk level | Rule Name |
|---|---|---|---|---|---|---|
| 10.32.3.15 | 10.248.6.209 | 10.32.3.15 | rpt00369.bcbst.com | HTTP | 8 | CVE-2021-40539 - RESTAPI EXPLOIT - HTTP(REQUEST) |
| 10.131.46.249 | 10.131.80.200 | 10.131.46.249 | reyprdrapid7.pidca.pas.local | HTTP | 8 | CVE-2020-5902 - DIRECTORY TRAVERSAL EXPLOIT - HTTP (REQUEST) |
| 64.39.98.55 | 10.151.4.132 | 10.151.4.132 | beta1-webfocusmobile.bcbst.com | HTTP | 8 | CVE-2021-22986 - F5 BIG-IP iCONTROL RCE EXPLOIT - HTTP(REQUEST) |
| 10.32.3.57 | 10.248.8.36 | 10.32.3.57 | rpt00374.bcbst.com | HTTP | 8 | CVE-2018-7600 - Drupal Remote Code Execution - HTTP (Request) |
| 10.32.3.57 | 10.248.8.55 | 10.32.3.57 | rpt00374.bcbst.com | HTTP | 8 | CVE-2010-1871 JBOSS Remote Code Execution - HTTP (Request) |

FIG. 2

| | Source IP Address | Destination IP Address | Target IP | Target hostname | app | Risk level | Rule Name |
|---|---|---|---|---|---|---|---|
| 121-6 | 10.32.3.15 | 10.248.6.209 | 10.32.3.15 | rpt00369.bcbst.com | HTTP | 8 | CVE-2021-40539 - RESTAPI EXPLOIT - HTTP(REQUEST) |
| 121-7 | 10.32.3.15 | 10.248.6.209 | 10.32.3.15 | rpt00369.bcbst.com | HTTP | 8 | CVE-2021-40539 - RESTAPI EXPLOIT - HTTP(REQUEST) |
| 121-8 | 10.32.3.15 | 10.248.6.209 | 10.32.3.15 | rpt00369.bcbst.com | HTTP | 8 | CVE-2021-40539 - RESTAPI EXPLOIT - HTTP(REQUEST) |
| 121-9 | 10.32.3.57 | 10.248.6.209 | 10.32.3.15 | rpt00369.bcbst.com | HTTP | 8 | CVE-2018-7600 - Drupal Remote Code Execution - HTTP (Request) |
| 121-10 | 10.32.3.15 | 10.248.6.209 | 10.32.3.15 | rpt00369.bcbst.com | HTTP | 8 | CVE-2021-40539 - RESTAPI EXPLOIT - HTTP(REQUEST) |

FIG. 4

SYSTEM AND METHOD FOR IDENTIFYING ANOMALOUS NETWORK THREAT EVENTS THAT OCCUR IN A PRIVATE COMPUTER NETWORK

TECHNICAL FIELD

The present disclosure is directed to computer network security.

BACKGROUND

Computer networks need to be protected against network threats, such as unauthorized intrusion, denial of service, advanced persistent threats, ransomware, etc. Cybersecurity vendors offer a variety of network security devices, including intrusion prevention systems, deep packet inspectors, firewalls, gateways, etc. A network security device may inspect network traffic and declare a network threat event in response to detecting data indicative of a network threat. Because of the increasing number and sophistication of network threats, typical network security devices declare a large number of network threat events, making it very difficult for network administrators who are in charge of cybersecurity to analyze the network threat events for verification and to identify those that need immediate attention.

BRIEF SUMMARY

In one embodiment, network threat events are declared in response to detecting network traffic data indicative of network threats in network traffic involving hosts of a private computer network. Common hosts of the private computer network are identified as those having a same Internet Protocol (IP) address and hostname in network threat events that have occurred within a sampling period for at least a minimum frequency. For each identified common host, a baseline of network behavior of the common host in network threat events that have occurred within a sliding time window is generated. A new threat event that has occurred after the sliding time window is identified as anomalous by comparing a network behavior of a common host in the new network threat event against the baseline of network behavior of the common host. An alert is issued in response to detecting an anomalous network threat event that has a risk rating that exceeds a threshold risk level. Identifying anomalous network threat events as disclosed herein improve the security of the private computer network by allowing network administrators in charge of cybersecurity to focus on network threat events that pose a high risk to the private computer network.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 shows example data of network threat events.

FIG. 4 shows example data of network threat events.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
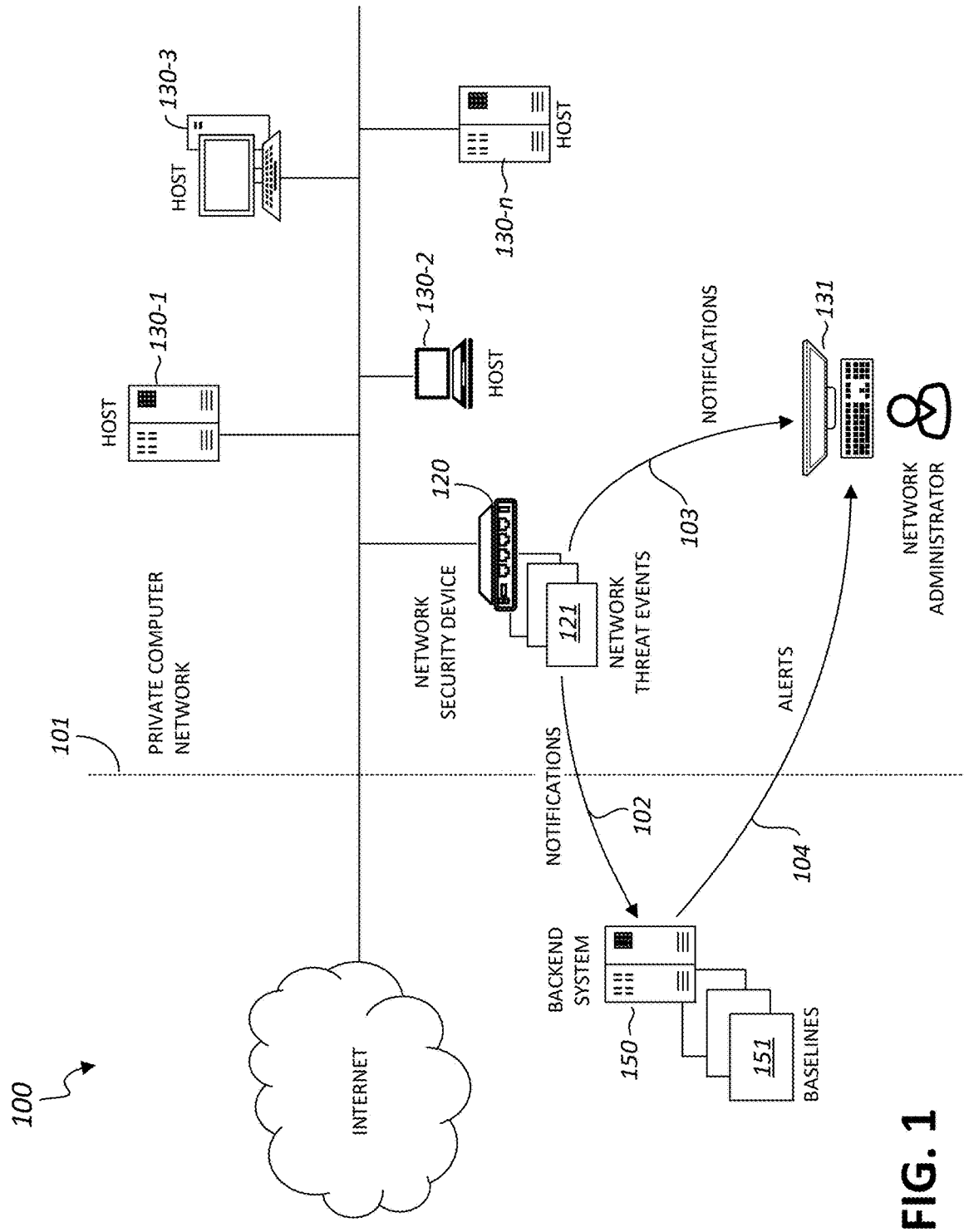
FIG. 1 shows a block diagram of a system for identifying anomalous network threat events in accordance with an embodiment of the present invention.

FIG. 1 shows a block diagram of a system for identifying anomalous network threat events in accordance with an embodiment of the present invention. In the example of FIG. 1, the system includes a backend system 150 and one or more network security devices 120.

In the example of FIG. 1, a dotted vertical line 101 represents a logical boundary between a private computer network (to the right of the line 101) and a public computer network (to the left of the line 101), which in this example includes the Internet. The private computer network includes the one or more network security devices 120, a plurality of hosts 130 (i.e., 130-1, 130-2, 130-3, . . . 130-n), and an administration computer 131. It is to be noted that only one network security device 120 is shown in FIG. 1 for clarity of illustration. A private computer network may have a plurality of network security devices 120. In that case, the plurality of network security devices 120 will send their notifications of network threat events to the backend system 150 for processing as disclosed herein.

A host 130 is a computing device of the private computer network, and may be a server computer, desktop computer, laptop computer, mobile, a virtual machine instance running on a server computer, etc. Generally, a host 130 may be identified by its Internet Protocol (IP) address, hostname, or by both its IP address and hostname. A hostname is a label that identifies the host 130 in network communications. An IP address may be mapped to a corresponding hostname. An IP address and a corresponding hostname is also referred to herein as a hostname-IP address pair.

A network security device 120 is a computing device that is configured to protect the hosts 130 of the private computer network against network threats, such as unauthorized intrusion, denial of service, advanced persistent threats, ransomware, etc. The network security device 120 may inspect network traffic involving the hosts 130 of the private computer network for data indicative of a network threat. The network security device 120 may be a commercially-available network security device that has been adapted to operate as disclosed herein. In one embodiment, the network security device 120 comprises the Deep Discovery Inspector™ appliance from Trend Micro Incorporated. As can be appreciated, embodiments of the present invention may be implemented in conjunction with other network security devices.

The network security device 120 declares a network threat event 121 in response to detecting network traffic data indicative of a network threat. Generally, information on known network threats may be obtained from threat intelligence sources, such as the Common Vulnerabilities and Exposures (CVE) system, cybersecurity organizations, etc. Information for identifying network threats may be incorporated in detection rules. For purposes of the present disclosure, the detection rules include signatures, heuristics, or other reference or guideline for detecting network threats by pattern matching, sandboxing, or other conventional cybersecurity technique. The network security device 120 inspects packets or other units of data of the network traffic to look for data that trigger (i.e., meet the requirements of) one or more detection rules. The network security device declares that a network threat event 121 has occurred when the network security device 120 finds network traffic data that trigger one or more detection rules for a particular network threat. The network security device 120 may declare a network threat event 121 by sending a notification to a backend system 150 (see arrow 102) and the administration computer 131 (see arrow 103). A notification includes data of the corresponding network threat event 121.

FIG. 2 shows example data of network threat events. In the example of FIG. 2, each row contains data of a network threat event 121. The example data of FIG. 2 are from IP packets of network traffic that caused the network threat events to occur. The columns indicate, from left to right, the source IP address, the destination IP address, the IP address of the target host of the network threat event ("Target IP"), the hostname of the target host of the network threat event ("Target hostname"), application ("app"), the severity of the network threat event ("Risk level"), and the detection rule that has been triggered ("Rule Name").

A target host of a network threat event is a host 130 (shown in FIG. 1) of the private computer network, which is being attacked by a network threat. A listing of hosts 130 of the private computer network may be maintained for case of identification. In one embodiment, a host 130 involved (i.e., appearing) in a network threat event is considered a target host of the network threat event. Each network threat event has a timestamp (not shown in FIG. 2) that indicates when the network threat event occurred, i.e., when the network security device 120 detected network traffic data that triggered a detection rule of a network threat.

Using the network threat event 121-1 as an example, a host 130 having the IP address "10.32.3.15" and hostname "rpt0369.bcbst.com" is the target host of the network threat event 121-1. The hostname-IP address pair of the host 130 in the network threat event 121-1 is thus "rpt0369.bcbst.com": "10.32.3.15". The network threat event 121-1 has a risk level of "8" indicating, in a risk level from 0 to 10, a severe threat to the private computer network. The network traffic data that caused the network threat event 121-1 triggered the detection rule for the network threat CVE-2021-40539, which pertains to REST API authentication bypass as per the National Vulnerability Database.

It is to be noted that a network threat event is not necessarily severe. For example, the risk levels for a private computer network may be grouped into low-risk (risk levels 0-4), medium-risk (risk levels 5-7), and high-risk (risk levels 8-10). High-risk network threat events indicate a severe threat to the private computer network, and thus need immediate attention compared to low-risk or medium-risk network threat events. That is, some network threat events pose a relatively low security risk to the private computer network, and accordingly may be remediated at a later time. Also, due to the nature of packet inspection, some network threat events may be false positives. Network administrators who are in charge of cybersecurity thus have to sift through network threat events to identify network threat events that are true positives and require immediate attention. This is a daunting task given the large number of network threat events declared in the private computer network.

The inventors performed a study involving analysis of 98 million network threat events that have occurred in several, different private computer networks over a 30 day sampling period. The inventors have discovered that for a given private computer network, 88% (87.1 million) of network threat events involve hosts that constitute 10% of the total hosts of the private computer network.

The results of the study further indicated that there is almost one-to-one mapping between a target hostname and a target IP address for a given private network in the context of network threat events. More particularly, nearly 90% of target hostnames have the same corresponding target IP addresses in network threat events during the sampling period. A critical (i.e., important) host of the private computer network may thus be identified as that having the same IP address and hostname in network threat events during the sampling period. That is, a critical host is presumed to be stable, and thus do not frequently change its IP address and hostname.

Embodiments of the present invention take advantage of the above discoveries regarding hosts involved in network threat events to facilitate identification of network threat events that really need attention as further explained below.

Continuing in FIG. 1, the backend system 150 may be implemented on dedicated servers or on a cloud computing platform, such as the Amazon Web Services (AWS)™. The backend system 150 is shown as being outside the logical perimeter of the private computer network for illustration purposes only. As can be appreciated, the backend system 150 may be deployed within the private computer network or other location depending on the particulars of the cybersecurity application.

The backend system 150 may include associated software for receiving a stream of notifications of network threat events 121 from the network security device 120 (see arrow 102), identifying common hosts in network threat events 121 that have occurred within a sampling period, creating baselines 151 of normal network behavior of the common hosts within a sliding time window that is shorter in duration than the sampling period, and issuing an alert (see arrow 104) in response to detecting a network threat event 121 that poses a high risk and indicate a network behavior of a common host that deviates from a baseline 151 of the common host.

In one embodiment, a common host is a host 130 of the private computer network that has the same IP address and host name in network threat events 121 during a sampling period for at least a minimum frequency. As a particular example, given a sampling period of 30 days and a minimum frequency of at least once a day for a least 25 days, a common host is a host 130 that has the same hostname and IP address, in network threat events 121 that have occurred during the 30 day sampling period, at least once a day for at least 25 days. As can be appreciated, the sampling period and the minimum frequency may be adjusted to suit particular private computer networks.

As per the above-mentioned study performed by the inventors, common hosts are a small percentage of the total hosts of a private computer network, yet cause the vast majority of network threat events in the private computer network. For each common host, the network behaviors of the common host in network threat events that have occurred during a sliding time window may be determined, e.g., by time series analysis, and used as a baseline of network behavior of the common host. A new network threat event that has occurred after the sliding time window and in which the common host exhibits a network behavior that deviates from its baseline may be deemed to be anomalous. Focusing on common hosts, as opposed to all of the hosts of the private computer network, advantageously allows for efficient time series analysis to generate the baselines of normal network behavior.

A network behavior of a common host 130 (i.e., a host 130 that has been deemed to be a common host) may be in terms of its interaction with another computing device in a network threat event 121. In one embodiment, the network behavior of the common host 130 is defined at least in terms of a detection rule that has been triggered by network traffic data in network communication involving the common host 130. The network behavior of the common host 130 may also be further defined in terms of source or destination IP address of the attacking computer and/or other data of the network threat event 121. Using the network threat event 121-2 of FIG. 2 as an example, a network behavior of a common host 130 may be defined as follows:

Target Host IP: 10.131.46.249
Target Host hostname: reyprdrapid7.pidca.pas.local
Threat: 4424: CVE-2020-5902-DIRECTORY TRAVERSAL EXPLOIT-HTTP (REQUEST)
Source of attack: 10.131.80.200

In the above example, the common host 130 that is the target host of the network threat event 121-2 has the IP address "10.131.46.249" and hostname "reyprdrapid7.pidca.pas.local". The network behavior of the common host 130 is engaging in a network communication that triggered the detection rule for the network threat CVE-2020-5902 (see FIG. 2, Rule Name for network threat event 121-2), which has a threat ID "4424". The network communication is with an attacking computer having the IP address "10.131.80.200" (see FIG. 2, destination IP address for network threat event 121-2).

The network behaviors of the common host 130 within a sliding time window may be determined and designated as normal. For example, detection rules of network threat events 121 involving the common host 130 during the sliding time window may all be deemed to be normal detection rules and incorporated in a baseline 151 of the common host 130. In that example, a particular network threat event 121 that occurs after the sliding time window and for triggering a detection rule that is not any of the normal detection rules may be deemed to be an anomalous network threat event 121. In other words, the particular network threat event 121 is an anomaly because, in the particular network threat event 121, the common host 130 is engaged in a network communication that is not expected of the common host 130, at least based on detection rules triggered by network traffic data of network communications of the common host 130 during the sliding time window.

The sliding time window for determining normal network behaviors of a common host is "sliding" in that it is advanced at a predetermined frequency. The sliding time window may be 7 days, 14 days, 21 days, or some other time period. The sliding time window may be advanced once a day, for example. A long sliding time window is preferable, but would consume more computing resources.

Figure 3A:
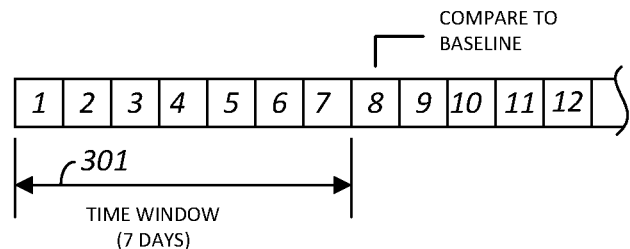
FIGS. 3A, 3B, and 3C graphically illustrate a sliding time window in accordance with an embodiment of the present invention.
Figure 3B:
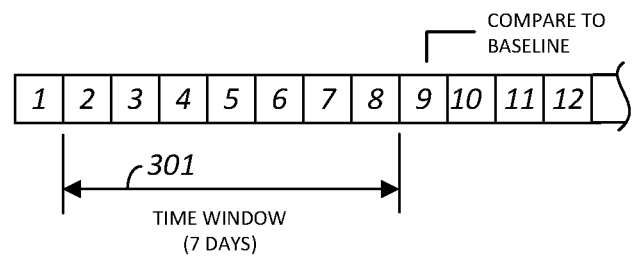
Figure 3C:
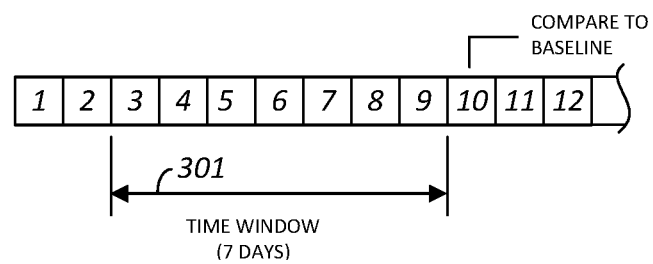

FIGS. 3A, 3B, and 3C graphically illustrate a sliding time window 301 in accordance with an embodiment of the present invention. FIGS. 3A, 3B, and 3C show each day of the month as a block. The sliding time window 301 is 7 days and advances forward in time once a day in this example.

Beginning with FIG. 3A, the sliding time window 301 is from day 1 to day 7 of the month. The baseline 151 of a common host 130 is generated from network threat events 121 involving the common host 130 and occurred from day 1 to day 7. Network behavior of the common host 130 in a network threat event 121 detected on day 8 is compared to the baseline 151 of the common host 130 to determine if the network behavior deviates from normal network behaviors of the common host 130.

Continuing to FIG. 3B, the sliding time window 301 is advanced to cover day 2 to day 8 of the month. The baseline 151 of the common host 130 is now generated from network threat events 121 involving the common host 130 and occurred from day 2 to day 8 of the month. Network behavior of the common host 130 in a network threat event 121 that has occurred on day 9 is compared to the baseline 151 of the common host 130 to determine if the network behavior deviates from normal network behaviors of the common host 130.

Continuing to FIG. 3C, the sliding time window 301 is advanced to cover day 3 to day 9 of the month. The baseline 151 of the common host 130 is now generated from network threat events 121 that have occurred from day 3 to day 9. Network behavior of the common host 130 in a network threat event 121 that has occurred on day 10 is compared to the baseline 151 of the common host 130 to determine if the network behavior deviates from normal network behaviors of the common host 130, and so on.

In one embodiment, each common host 130 has its own, separate baseline 151. That is each baseline 151 is a baseline of network behavior of a particular common host 130. To reduce computing power and storage consumption, common hosts 130 that exhibit the same network behaviors in network threat events 121 occurring during a same sliding time window may be clustered to share the same baseline 151. For example, all common hosts 130 having network communications that trigger the same detection rules during the same sliding time window may be clustered together to share the same baseline 151.

Referring back to FIG. 1, the backend system 150 may continually receive a stream of notifications of network threat events 121 (see arrow 102) from the network security device 120. A common host 130 has a corresponding baseline 151 generated from network threat events 121 that have occurred during a sliding time window. For each new network threat event 121 that involves the common 130 and that has occurred after the sliding time window, the backend system 150 compares a network behavior of the common host 130 in the new network threat event 121 to the baseline 151 of the common host 130. The backend system 150 deems the new network threat event 121 to be an anomaly when the network behavior of the common host 130 in the new network threat event 121 deviates from normal network behaviors indicated in the baseline 151. For example, the new network threat event 121 may involve a detection rule that is not any of the detection rules in the baseline 151 of the common host 130. The backend system 150 issues an alert in response to detecting that the new network threat event 121 is an anomaly and poses a severe threat to the private computer network, e.g., when the risk level of the new network threat event 121 exceeds a risk threshold.

An alert issued by the backend system 150 may include the corresponding network threat event 121 and other related data. The alert may be in the form of a text message, email, visual indicator (e.g., flashing object or a message on a display screen) or other warning that informs the network administrator of the detection of the anomalous network threat event 121.

The administration computer 131 may be a workstation, virtual machine running on a cloud computing platform, or other computing device employed by the network administrator of the private computer network to receive and analyze network threat events 121 (see arrow 103) and alerts (see arrow 104). As previously noted, it is very difficult for the network administrator to analyze the large number of network threat events 121 declared by the network security device 120. Advantageously, an alert from the backend system 150 identifies a severe network threat event 121 from among a large number of network threat events 121, thereby allowing the network administrator to readily identify those that require immediate attention.

FIG. 4 shows example data of network threat events. The columns and rows in FIG. 4 have the same type of data as those in FIG. 2 for continuity of illustration.

In the example of FIG. 4, a baseline 151 of network behavior of a common host 130 was generated from network threat events 121 that involve the common host 130 and has occurred during a sliding time window. The network threat events 121-6 to 121-10 occurred after the sliding time window and involve the common host 130, which is identified by its target IP address and target hostname.

In network threat events 121-6, 121-7, 121-8, and 121-10, the common host 130 exhibited the same network behavior, which triggered the detection rule CVE-2021-40539-RESTAPI EXPLOIT-HTTP (REQUEST) (FIG. 4, Rule name). This network behavior has previously been detected as normal and included in the baseline 151 of the common host 130. Therefore, the network threat events 121-6, 121-7, 121-8, and 121-10 are deemed to be normal network threat events.

In contrast, in the network threat event 121-9, the common host 130 exhibited a new network behavior, which triggered the detection rule CVE-2018-7600-Drupal Remote Code Execution-HTTP (Request) (see dashed box 401). This new network behavior is not in the baseline 151 of the common host 130. Accordingly, the network threat event 121-9 is deemed to be an anomaly. And because the risk level of the network threat event 121-9 is a level 8 (see dashed box 402), which is above the risk threshold of the private computer network in this example, the network threat event 121-9 causes the backend system 150 to issue a corresponding alert to warn the network administrator. This allows the network administrator to prioritize remediation of the network threat event 121-9.

Figure 5:
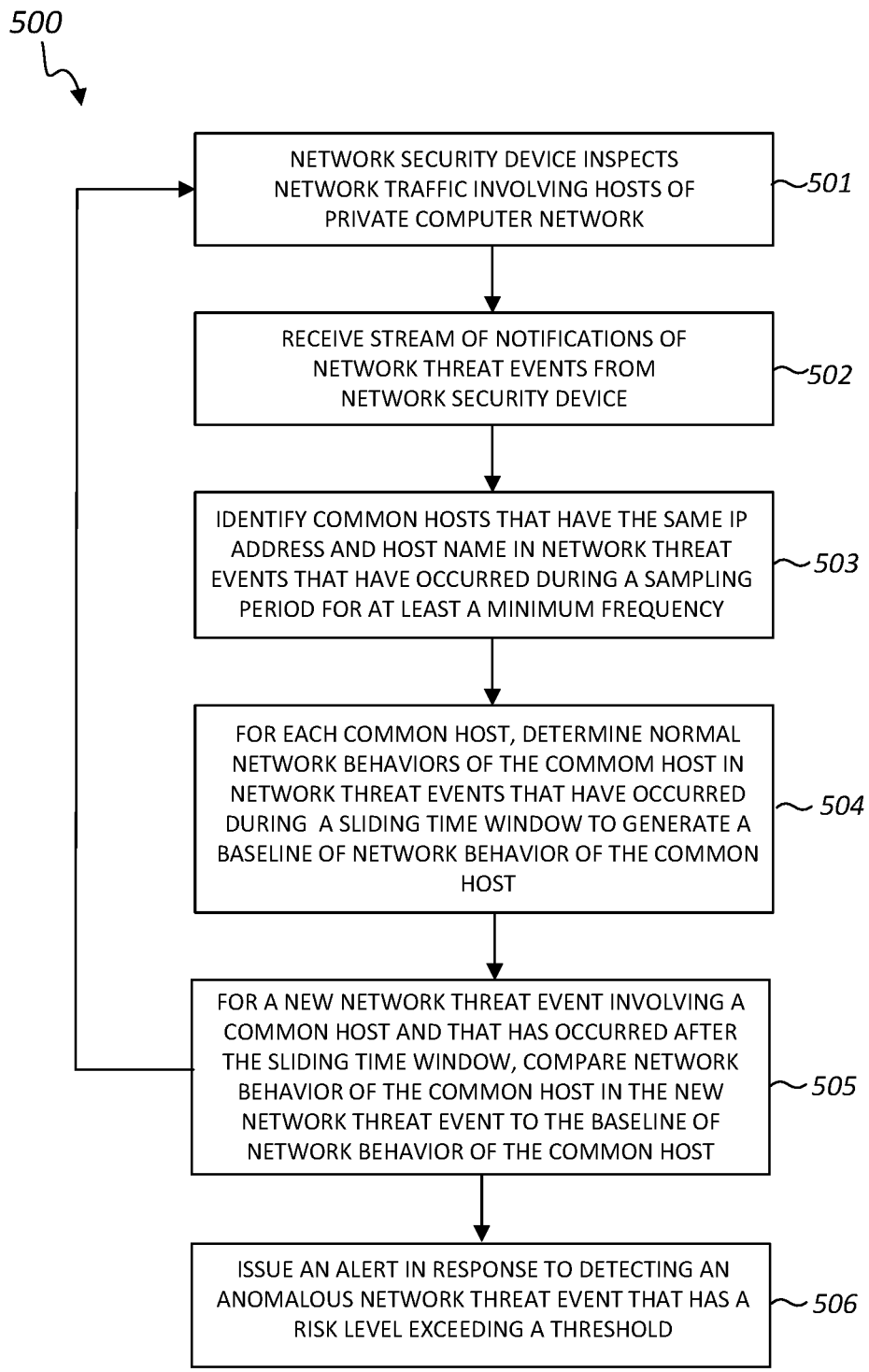
FIG. 5 shows a flow diagram of a method of detecting anomalous network threat events in accordance with an embodiment of the present invention.

FIG. 5 shows a flow diagram of a method 500 of detecting anomalous network threat events in accordance with an embodiment of the present invention. The method 500 is explained using previously disclosed components. As can be appreciated, the method 500 may also be performed using other components without detracting from the merits of the present invention.

In step 501, a network security device inspects network traffic that involve hosts of a private computer network. The network security device declares a network threat event and sends out a corresponding notification upon finding network traffic data indicative of a network threat.

In step 502, a backend system receives a stream of notifications of network threat events from the network security device.

In step 503, the backend system identifies common hosts from the network threat events. Each of the common hosts being a host of the private computer network and has the same IP address and hostname in network threat events that have occurred during a sampling period for at least a minimum frequency.

In step 504, for each common host, the backend system determines the normal network behaviors of the common host in network threat events that have occurred within a sliding time window to generate a baseline of network behavior of the common host. The baseline may be generated by performing time series analysis on network threat events that have occurred during the sliding time window. As a particular example, the baseline may simply be detection rules of all network threat events involving the common host and occurring during the sliding time window, with the sliding time window time being advanced at a predetermined frequency. The baseline may be optimized for particular cybersecurity applications by limiting normal network behavior as those occurring at least a threshold number of times, excluding specific hosts from being a common host, including the source of the attack as part of the baseline (to prioritize attacks from a given region), etc.

In step 505, for a new threat event involving a common host and occurring after the sliding time window, a network behavior of the common host in the new threat event is compared to the baseline of network behavior of the common host. The new threat event is deemed to be an anomaly when the network behavior of the common host in the new threat event deviates from the baseline of network behavior of the common host. For example, the backend system may compare a particular detection rule involved in the new threat event against the baseline to determine whether or not the particular detection rule is included in the baseline. The new network threat event is deemed to be an anomaly when the particular detection rule is not in the baseline.

In step 506, the backend system may issue an alert in response to detecting an anomalous network threat event that has a risk level that is higher than a risk threshold.

In the method 500, the network security device continues to inspect network traffic, and send a stream of notifications of network threat events to the backend system in response to detecting network traffic data indicative of a network threat. The backend system may continue to process the network threat events to update the common hosts and their corresponding baselines as disclosed. More particularly, the sampling period may be advanced forward in time to have a new set of network threat events for identifying common hosts. The sliding time window may be advanced forward in time to update existing baselines, remove baselines of hosts that are no longer common as per the advanced sampling period, and/or create new baselines of new common hosts.

In one embodiment, the method 500 is implemented using the Apache Spark analytics engine to generate baselines of network behavior and to detect anomalous threat events of a common host in parallel. The Apache Spark analytics engine allows for concurrent operations, thus allowing for detection and mitigation of anomalous threat events efficiently. As can be appreciated, embodiments of the present invention may also be implemented using other, commonly-available engines or platforms without detracting from the merits of the present invention.

Figure 6:
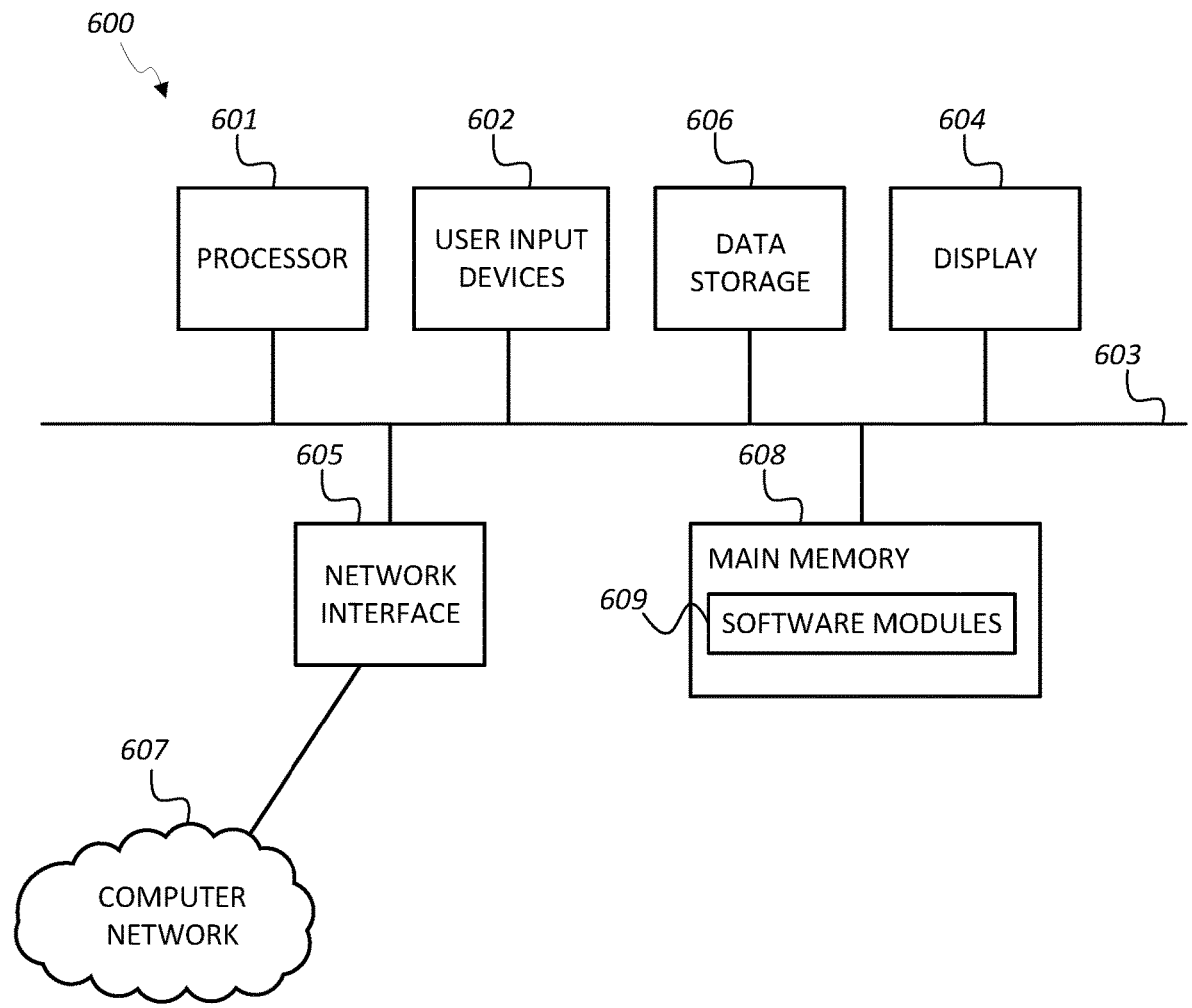
FIG. 6 shows a block diagram of a computer system that may be employed with embodiments of the present invention.

Referring now to FIG. 6, there is shown a block diagram of a computer system 600 that may be employed with embodiments of the present invention. The computer system 600 may be employed as a network security device, backend system, or other computing device described herein. The computer system 600 may have fewer or more components to meet the needs of a particular cybersecurity application. The computer system 600 may include one or more processors 601. The computer system 600 may have one or more buses 603 coupling its various components. The computer system 600 may include one or more user input devices 602 (e.g., keyboard, mouse), one or more data storage devices 606 (e.g., hard drive, optical disk, solid state drive), a display screen 604 (e.g., liquid crystal display, flat panel monitor), a computer network interface 605 (e.g., network adapter, modem), and a main memory 608 (e.g., random access memory). The computer network interface 605 may be coupled to a computer network 607, which in this example includes the Internet.

The computer system 600 is a particular machine as programmed with one or more software modules 609, comprising instructions stored non-transitory in the main memory 608 for execution by at least one processor 601 to cause the computer system 600 to perform corresponding programmed steps. An article of manufacture may be embodied as computer-readable storage medium including instructions that when executed by at least one processor 601 cause the computer system 600 to be operable to perform the functions of the one or more software modules 609.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of identifying anomalous network threat events that occur in a private computer network, the method comprising:
    monitoring network traffic of a plurality of hosts of the private computer network;
    receiving a stream of notifications of network threat events, wherein a network threat event occurs when network traffic data indicative of a network threat are detected in the network traffic;
    identifying a first plurality of common hosts from among the plurality of hosts of the private computer network, each of the first plurality of common hosts having a same hostname and Internet Protocol (IP) address for at least a minimum frequency in network threat events that have occurred within a sampling period;
    for each common host of the first plurality of common hosts, generating a baseline of network behavior of the common host in network threat events that have occurred within a sliding time window that is shorter in duration than the sampling period;
    receiving notification of a first network threat event involving a first common host of the first plurality of common hosts and that has occurred after the sliding time window;
    comparing a first network behavior of the first common host in the first network threat event to a baseline of network behavior of the first common host; and
    issuing an alert in response to detecting that the first network behavior of the first common host in the first network threat event deviates from the baseline of network behavior of the first common host and the first network threat event has a risk level that exceeds a risk threshold.

2. The method of claim 1, wherein the baseline of network behavior of the first common host indicates a plurality of detection rules that have been triggered by network communications of the first common host.

3. The method of claim 2, wherein the first network behavior of the first common host in the first network threat event triggered a detection rule that is not one of the plurality of detection rules indicated in the baseline of network behavior of the first common host.

4. The method of claim 1, further comprising:
    prioritizing remediation of the first network threat event in response to the issuance of the alert.

5. The method of claim 1, further comprising:
    advancing the sampling period forward in time to an advanced sampling period; and
    identifying a second plurality of common hosts from among the plurality of hosts of the private computer network, each of the second plurality of common hosts having a same hostname and IP address for at least a minimum frequency in network threat events that have occurred within the advanced sampling period.

6. The method of claim 5, further comprising:
    advancing the sliding time window forward in time to an advanced sliding time window; and
    for each common host of the second plurality of common hosts, generating a baseline of network behavior of the common host of the second plurality of common hosts in network threat events that have occurred within the advanced sliding time window.

7. The method of claim 1, wherein the network traffic of the plurality of hosts of the private computer network is monitored by a network security device, and the network security device sends the stream of notifications of network threat events.

8. The method of claim 7, wherein a backend system receives the stream of notifications of network threat events from the network security device, and the backend system issues the alert by sending the alert to a network administrator of the private computer network.

9. The method of claim 1, further comprising:
    advancing the sliding time window forward in time to an advanced sliding time window; and
    for each common host of the first plurality of common hosts, generating a new baseline of network behavior of the common host in network threat events that have occurred within the advanced sliding time window.

10. A system for identifying anomalous network threat events that occur in a private computer network, the system comprising:
    a network security device, the network security device comprising a memory and at least one processor, the memory of the network security device storing instructions that when executed by the at least one processor of the network security device cause the network security device to:
        monitor network traffic of a plurality of hosts of the private computer network; and
        send a stream of notifications of network threat events, wherein a network threat event occurs when the network security device detects network traffic data indicative of a network threat; and
    a backend system, the backend system comprising a memory and at least one processor, the memory of the backend system storing instructions that when executed by the at least one processor of the backend system cause the backend system to:
        identify a first plurality of common hosts from among the plurality of hosts of the private computer network, each of the first plurality of common hosts having a same hostname and Internet Protocol (IP) address for at least a minimum frequency in network threat events that have occurred during a sampling period;

for each common host of the first plurality of common hosts, generate a baseline of network behavior of the common host in network threat events that have occurred during a sliding time window;

receive notification of a first network threat event that involves a first common host of the first plurality of common hosts and that has occurred after the sliding time window;

compare a first network behavior of the first common host in the first network threat event to a baseline of network behavior of the first common host; and issue an alert in response to detecting that the first network behavior of the first common host in the first network threat event deviates from the baseline of network behavior of the first common host and the first network threat event has a risk level that exceeds a risk threshold.

11. The system of claim 10, wherein the baseline of network behavior of the first common host indicates a plurality of detection rules that have been triggered by network communications of the first common host.

12. The system of claim 11, wherein the first network behavior of the first common host in the first network threat event triggered a detection rule that is not one of the plurality of detection rules indicated in the baseline of network behavior of the first common host.

13. The system of claim 10, further comprising:
an administration computer comprising at least one processor and a memory, the memory of the administration computer storing instructions that when executed by the at least one processor of the administration computer cause the administration computer to receive the alert and display the alert on a display screen of the administration computer.

14. The system of claim 10, wherein the instructions stored in the memory of the backend system, when executed by the at least one processor of the backend system, cause the backend system to:
advance the sampling period forward in time to an advanced sampling period; and
identify a second plurality of common hosts from among the plurality of hosts of the private computer network, each of the second plurality of common hosts having a same hostname and IP address for at least a minimum frequency in network threat events that have occurred during the advanced sampling period.

15. The system of claim 10, wherein the instructions stored in the memory of the backend system, when executed by the at least one processor of the backend system, cause the backend system to:
advance the sliding time window forward in time to an advanced sliding time window; and
for each common host of the first plurality of common hosts, generate a new baseline of network behavior of the common host in network threat events that have occurred within the advanced sliding time window.

16. A method of identifying anomalous network threat events that occur in a private computer network, the method comprising:
declaring a plurality of network threat events, each of the network threat events indicating detection of network traffic data that are indicative of a network threat in network traffic involving a plurality of hosts of the private computer network;

identifying a plurality of common hosts from among the plurality of hosts of the private computer network, each of the plurality of common hosts having a same Internet Protocol (IP) address and hostname for at least a minimum frequency in network threat events that have occurred during a sampling period;

for each common host of the plurality of common hosts, generating a baseline of network behavior of the common host in network threat events that have occurred during a sliding time window that is shorter in duration than the sampling period; and detecting an anomalous network threat event that has occurred after the sliding time window in response to a first common host of the plurality of common hosts exhibiting a new network behavior in the anomalous network threat event, wherein the new network behavior deviates from a baseline of network behavior of the first common host and the anomalous network threat event has a risk level that exceeds a risk threshold.

17. The method of claim 16, further comprising:
issuing an alert in response to detecting the anomalous network threat event.

18. The method of claim 17, further comprising:
receiving the alert in an administration computer; and
displaying the alert on a display screen of the administration computer.

19. The method of claim 16, further comprising:
advancing the sliding time window forward in time to an advanced sliding time window; and
for each common host of the plurality of common hosts, generating a new baseline of network behavior of the common host in network threat events that have occurred within the advanced sliding time window.

20. The method of claim 19, further comprising:
receiving declaration of a new network threat event that has occurred after the advanced sliding time window;
comparing a new network behavior of a second common host of the plurality of common hosts in the new network threat event against a new baseline of network behavior of the second common host to determine whether the new network threat event is anomalous.

* * * * *